US008560022B2

(12) United States Patent
Ozaki

(10) Patent No.: US 8,560,022 B2
(45) Date of Patent: Oct. 15, 2013

(54) IN-VEHICLE HANDSFREE APPARATUS

(75) Inventor: Takahisa Ozaki, Gamagori (JP)

(73) Assignee: Denso Corporation, Kariya (JP)

( * ) Notice: Subject to any disclaimer, the term of this patent is extended or adjusted under 35 U.S.C. 154(b) by 1347 days.

(21) Appl. No.: 11/906,978

(22) Filed: Oct. 4, 2007

(65) Prior Publication Data

US 2008/0085745 A1 Apr. 10, 2008

(30) Foreign Application Priority Data

Oct. 6, 2006 (JP) ................................ 2006-275397

(51) Int. Cl.
*H04M 1/00* (2006.01)
(52) U.S. Cl.
USPC ............... 455/569.1; 455/569.2; 455/566; 455/575.9; 455/99; 455/551; 455/550.1; 455/41.2; 379/88.01; 379/414
(58) Field of Classification Search
USPC ............... 455/569.1, 569.2, 563, 564, 575.9; 379/88.03; 340/618
See application file for complete search history.

(56) References Cited

U.S. PATENT DOCUMENTS

| 4,845,486 | A | * | 7/1989 | Knight et al. | 340/618 |
|---|---|---|---|---|---|
| 5,450,471 | A | * | 9/1995 | Hanawa et al. | 455/550.1 |
| 5,651,056 | A | * | 7/1997 | Eting et al. | 379/88.01 |
| 6,473,629 | B1 | * | 10/2002 | Chang | 455/566 |
| 6,885,848 | B2 | * | 4/2005 | Lee | 455/41.2 |
| 7,050,834 | B2 | * | 5/2006 | Harwood et al. | 455/563 |
| 7,787,907 | B2 | * | 8/2010 | Zeinstra et al. | 455/563 |
| 2001/0002211 | A1 | * | 5/2001 | Lee | 379/414 |
| 2002/0032048 | A1 | | 3/2002 | Kitao et al. | |
| 2003/0114202 | A1 | * | 6/2003 | Suh et al. | 455/569 |
| 2005/0135573 | A1 | * | 6/2005 | Harwood et al. | 379/88.03 |
| 2005/0143134 | A1 | * | 6/2005 | Harwood et al. | 455/563 |
| 2005/0197061 | A1 | * | 9/2005 | Hundal | 455/41.2 |
| 2006/0019720 | A1 | * | 1/2006 | Kakehi | 455/569.2 |
| 2007/0178944 | A1 | | 8/2007 | Mitsuru et al. | |
| 2008/0146291 | A1 | * | 6/2008 | Huisken | 455/569.1 |
| 2009/0011799 | A1 | * | 1/2009 | Douthitt et al. | 455/569.1 |

FOREIGN PATENT DOCUMENTS

WO    WO 2006074345 A1 *  7/2006

OTHER PUBLICATIONS

Notice of Refusal dated Dec. 22, 2009 in Japanese Application No. 2006-275397 with English translation thereof.
Office Action dated Apr. 1, 2010 in corresponding German Application No. 10 2007 047 374.7 with English translation thereof.

* cited by examiner

*Primary Examiner* — Junpeng Chen
(74) *Attorney, Agent, or Firm* — Harness, Dickey & Pierce, PLC

(57) ABSTRACT

If a cellular phone with which a communication link is established is compliant with PBAP (Phone Book Access Profile), an in-vehicle navigation apparatus with a handsfree function stores and arranges, in a work memory device, phone book data transmitted automatically from the cellular phone. Thus, the newest phone book data can be made available. On the other hand, if the cellular phone is not compliant with PBAP, the in-vehicle navigation apparatus stores and arranges, in the work memory device, phone book data, which are presently stored in a storage memory device. Thus, if the presently stored phone book data, which are not newest, are desirable, they can be made available.

19 Claims, 2 Drawing Sheets

IN-VEHICLE HANDSFREE APPARATUS

CROSS REFERENCE TO RELATED APPLICATION

This application is based on and incorporates herein by reference Japanese Patent Application No. 2006-275397 filed on Oct. 6, 2006.

FIELD OF THE INVENTION

The present invention relates to an in-vehicle handsfree apparatus establishing a communication link with a cellular phone compliant or incompliant with a communication protocol which specifies automatic transmission of phone book data.

BACKGROUND OF THE INVENTION

There is a cellular phone which transmits phone book data automatically. For example, when a user carrying the cellular phone gets in a vehicle, the cellular phone enters a short range wireless communication area of an in-vehicle handsfree apparatus. When the cellular phone and the in-vehicle handsfree apparatus establish the communication link with each other, the cellular phone transmits the phone book data automatically to the in-vehicle handsfree apparatus (refer to Patent document 1).

Patent document 1: JP-2002-193046 A

The following explains a case where a cellular phone transmits phone book data automatically by Bluetooth (registered trademark) communication.

A cellular phone compliant with PBAP (Phone Book Access Profile), which specifies automatic transmission of phone book data, can transmit phone book data automatically to the in-vehicle handsfree apparatus. In contrast, a cellular phone incompliant with PBAP cannot transmit phone book data automatically to the in-vehicle handsfree apparatus. Moreover, when phone book data are transmitted from the cellular phone, the in-vehicle handsfree apparatus stores and arranges the transmitted phone book data in the work memory device. When the user operates to demand a display of phone book data, the phone book data stored in the work memory device is displayed. The displayed phone book can be then searched for a phone number to make a phone call.

Thus, in the state where the cellular phone compliant with PBAP exists in the Bluetooth communication area of the in-vehicle handsfree apparatus, the newest phone book data stored in the cellular phone can be transmitted automatically to the in-vehicle handsfree apparatus and stored. The newest phone book data can be searched for a phone number to make a phone call.

In contrast, in the state where the cellular phone incompliant with PBAP exists in the Bluetooth communication area, the newest phone book data stored in the cellular phone cannot be transmitted automatically to the in-vehicle handsfree apparatus and stored. Therefore, if the user does not select transmitting the phone book data, the newest phone book data cannot be used for retrieving a phone number for making a phone call. This involves a disadvantage in usability.

SUMMARY OF THE INVENTION

The present invention is made in view of the above-mentioned situation. It is an object of the present invention to provide an in-vehicle handsfree apparatus, which can establish a communication link with a cellular phone compliant or incompliant with a communication protocol specifying automatic transmission of phone book data and can raise the usability of phone book data regardless of the type of the cellular phone, being compliant or incompliant with the communication protocol.

To achieve the above object, as an example of the present invention, an in-vehicle handsfree apparatus is provided as follows. A communication unit is configured to establish a communication link with either a first cellular phone compliant with a communication protocol or a second cellular phone incompliant with the communication protocol, the communication protocol specifying automatic transmission of phone book data. A first storing unit is configured to store phone book data transmitted from the first cellular phone or the second cellular phone. A second storing unit is configured to store phone book data transmitted from the first cellular phone or the second cellular phone. A control unit is configured to use the phone book data stored in the first storing unit when a request for using phone book data occurs. Here, the control unit determines whether a certain cellular phone, with which the communication unit establishes the communication link, is compliant with the communication protocol. When determining the certain cellular phone is compliant, the control unit stores and arranges, in the first storing unit, phone book data, which are transmitted automatically from the certain cellular phone based on the communication protocol. In contrast, when determining that the certain cellular phone is not compliant, the control unit stores and arranges, in the first storing unit, phone book data, which are presently stored in the second storing unit.

According to another example of the present invention, an in-vehicle handsfree apparatus is provided as follows. A communication unit is configured to establish a communication link with a cellular phone compliant or incompliant with a communication protocol, which specifies automatic transmission of phone book data. A determination unit is configured to determine whether the cellular phone, with which the communication link is established, is compliant with the communication protocol. A control unit is configured to (i) display and make available phone book data, which are transmitted automatically from the cellular phone, when determining that the cellular phone is compliant, and (ii) display and make available phone book data, which are previously stored, when determining that the cellular phone is not compliant.

According to yet another example of the present invention, a method is provided for using phone book data of a cellular phone in a handsfree apparatus. The method comprises: establishing a communication link with a cellular phone compliant or incompliant with a communication protocol, which specifies automatic transmission of phone book data; determining whether the cellular phone, with which the communication link is established, is compliant with the communication protocol; displaying and making available phone book data, which are transmitted automatically from the cellular phone, when determining that the cellular phone is compliant; and displaying and making available phone book data, which are previously stored, when determining that the cellular phone is not compliant.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

Figure 1:
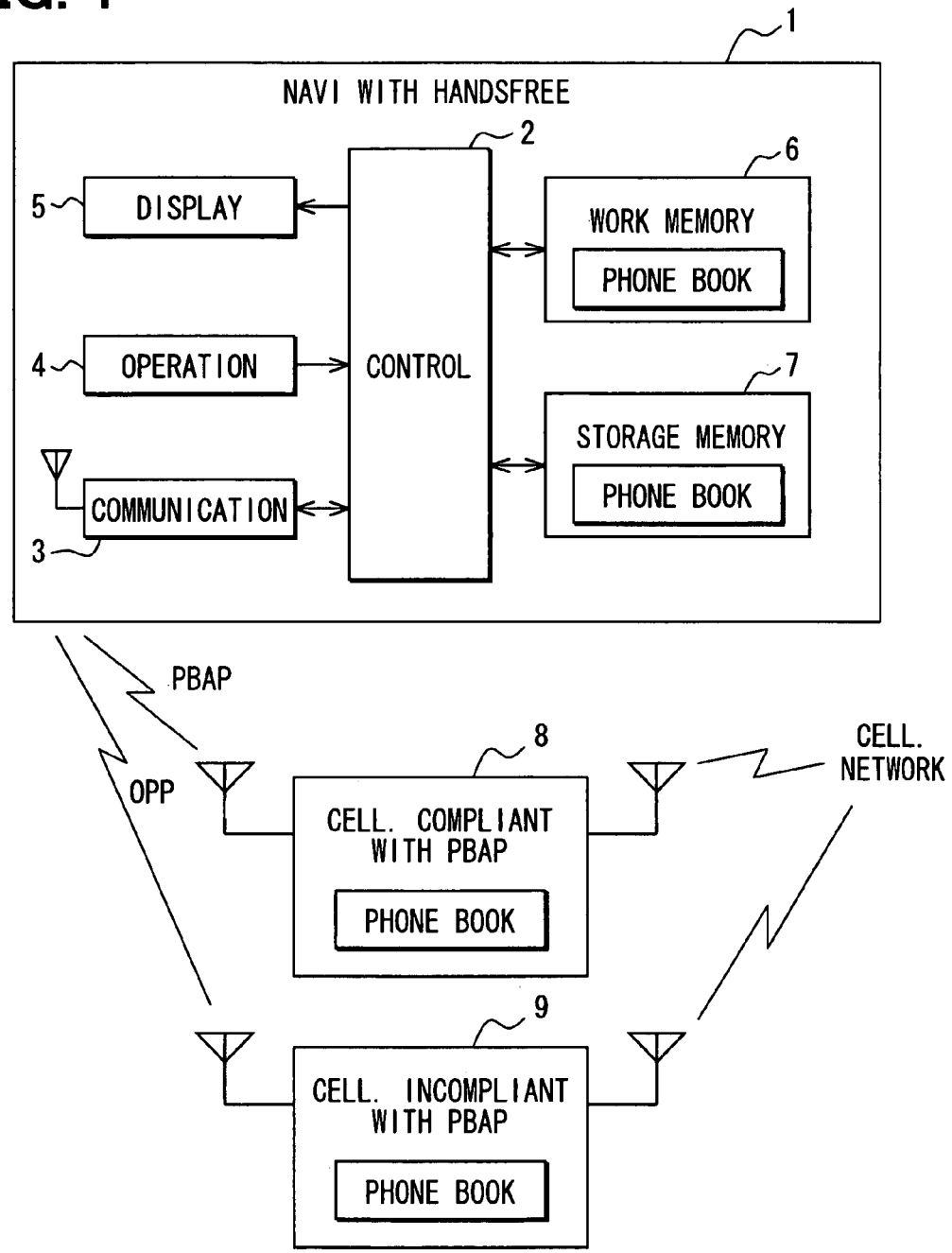
FIG. 1 is a functional block diagram showing an embodiment of the present invention.

The present invention is explained with reference to drawings about an embodiment applied to an in-vehicle navigation apparatus with a handsfree function and a Bluetooth communication function. FIG. 1 indicates a functional block diagram of an in-vehicle navigation apparatus 1 mounted in a subject vehicle. The in-vehicle navigation apparatus 1 includes a control unit 2, a communication unit 3, an operation unit 4, a display unit 5, a work memory device 6 (as a first storing unit), and a storage memory device 7 (as a second storing unit).

The control unit 2 controls an overall operation such as a communication operation and a data control operation of the in-vehicle navigation apparatus 1. The communication unit 3 performs communications based on a communication standard of Bluetooth. If a cellular phone 8, 9 with the Bluetooth communication function (hereinafter only called "cellular phone") exists within a Bluetooth communication area, the communication unit 3 establishes a communication link with the cellular phone 8, 9. In this case, the communication unit 3 establishes the communication link using a protocol with which the corresponding cellular phone is compliant. If the cellular phone is compliant with PBAP (Phone Book Access Profile) which specifies automatic transmission of phone book data, PBAP is used between the cellular phone 8 and communication unit 3. If the cellular phone is incompliant with PBAP, but compliant with OPP (Object Push Profile), OPP is used between the cellular phone 9 and communication unit 3.

The operation unit 4 detects a user's operation to thereby output a corresponding operation signal to the control unit 2. The display unit 5 displays a display window based on a display signal inputted from the control unit 2. The work memory device 6 is volatile memory and stores phone book data. The phone book data are transmitted from the cellular phone 8 compliant with PBAP automatically without need of the user's operation, or are transmitted from the cellular phone 9 incompliant with PBAP. The storage memory device 7 is nonvolatile memory and stores the phone book data transmitted from the cellular phone 9 incompliant with PBAP.

Here, the control unit 2 manages storage operation of the phone book data in the work memory device 6 or the storage memory device 7. For example, when the user demands a display of the phone book data (i.e., when a request for displaying phone book data occurs) via the operation unit 4, the phone book data stored in the work memory device 6 are displayed on the display unit 5. In addition, besides the functional blocks in FIG. 1, the navigation apparatus 1 further includes functional blocks necessary for navigation as follows: a present position detection unit which detects a present position of the subject vehicle, a route retrieval unit which retrieves a route from a present position to a destination, a map data read unit to read out map data from a record medium, a VICS receiver which receives information from the VICS (registered trademark, Vehicle Information and Communication System) center, and a speech recognition unit which recognizes speeches uttered by users.

Moreover, the navigation apparatus 1 starts and stops in interlock with the ACC (accessory) switch being turned ON and OFF, respectively. For example, when the ACC switch changes from ON to OFF according to the user operation and the supply of the power thus stops, the phone book data stored presently in the work memory device 6 are eliminated, but the phone book data stored presently in the storage memory device 7 are not eliminated (i.e., the stored data are hold).

Figure 2:
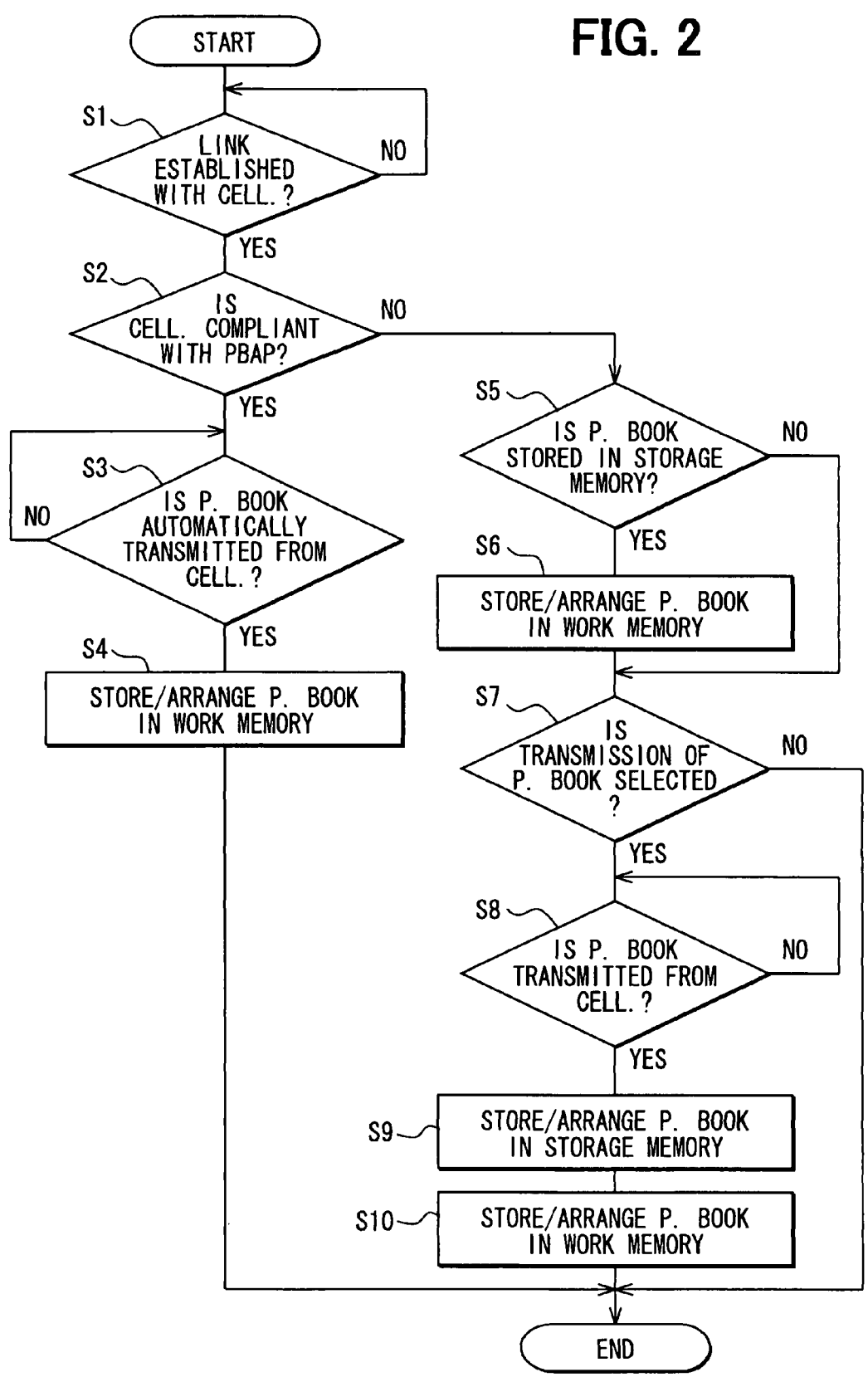
FIG. 2 is a flow chart diagram.

Next, the operation of the configuration described above is explained with reference to FIG. 2. The control unit 2 determines that a communication link with a certain cellular phone is established ("YES" at Step S1) when the certain cellular phone exists within the Bluetooth communication area of the in-vehicle navigation apparatus 1. The control unit 2 then determines whether the certain cellular phone with which the communication link is established is a cellular phone 8 compliant with PBAP or a cellular phone 9 incompliant with PBAP (Step S2).

When the control unit 2 determines that the certain cellular phone is compliant with PBAP ("YES" at Step S2), the communication unit 3 uses PBAP for communicating with the cellular phone 8 compliant with PBAP and stands ready to receive phone book data transmitted automatically from the cellular phone 8 compliant with PBAP (Step S3). When determining that the phone book data are transmitted automatically from the cellular phone 8 ("YES" at Step S3), the control unit 2 stores and arranges the phone book data transmitted automatically from the cellular phone 8 in the work memory device 6 (Step S4).

Thus, when the user then demands a display of the phone book data via the operation unit 4, the newest phone book data stored in the work memory device 6, i.e., the phone book data transmitted automatically from the cellular phone 8 compliant with PBAP, is displayed on the display unit 5. Thereafter the newest phone book data transmitted automatically from the cellular phone 8 compliant with PBAP can be used for the user to retrieve a phone number, and the user can make a phone call using the phone number retrieved from the phone book data.

Moreover, when the user amends (adds, deletes, etc.) the phone book data in the cellular phone 8, the amended phone book data are transmitted automatically and stored and arranged in the work memory device 6. The newest phone book data can be thereby constantly arranged in the work memory device 6.

On the other hand, when the control unit 2 determines that the certain cellular phone with which the communication link is established is a cellular phone 9 incompliant with PBAP ("NO" at Step S2), the communication unit 3 uses OPP, instead of using PBAP, for communicating with the certain cellular phone 9 incompliant with PBAP. Thereby the control unit 2 does not stand ready to receive phone book data transmitted automatically from the certain cellular phone 9 incompliant with PBAP, and determines whether phone book data are presently stored in the storage memory device 7 (Step S5).

When determining that the phone book data are stored presently in the storage memory device 7 ("YES" at Step S5), the control unit 2 stores and arranges, in the work memory device 6, the phone book data stored presently in the storage memory device 7 (Step S6).

Thus, when the user demands a display of the phone book data via the operation unit 4, the phone book data stored in the work memory device 6, i.e., the phone book data stored just previously in the storage memory device 7, is displayed on the display unit 5. Thereafter the phone book data stored just previously in the storage memory device 7 can be used for the user to retrieve a phone number, and the user can make a phone call using the retrieved phone number.

Subsequently, for example, the control unit 2 displays a "telephone directory transmission" button on the display unit 5, asks the user whether to transmit the phone book data, and determines whether the user selects transmitting the phone book data (Step S7). When the control unit 2 determines that the user operates the "telephone directory transmission" button displayed on the display unit 5 to select transmitting the phone book data ("YES" at Step S7), the control unit 2 demands transmission of the phone book data to the cellular phone 9 incompliant with PBAP, and stands ready to receive the phone book data transmitted from the cellular phone 9 (Step S8). When determining that the phone book data are transmitted from the cellular phone 9 ("YES" at Step S8), the control unit 2 stores and arranges the phone book data transmitted from the cellular phone 9 in the storage memory device 7 (Step S9) and in the work memory device 6 (Step S10).

Thus, the newest phone book data stored presently in the cellular phone 9 can be stored and arranged in the storage memory device 7. When the communication link is next established with the cellular phone 9, the newest phone book data stored presently in the cellular phone 9 will be able to be used for retrieving a phone number, and the retrieved phone number will be able to be used for making a phone call.

Moreover, the user may amend (add, delete, etc.) the phone book data in the cellular phone 9. In this case, at a time when the user selects transmitting phone book data, the amended phone book data are transmitted, and stored and arranged in the storage memory device 7 and work memory device 6. The storage memory device 7 and the work memory device 6 can store the newest phone book data at the time.

In the in-vehicle navigation apparatus 1 according to the present embodiment, when the communication link is established with a certain cellular phone, whether the certain cellular phone is compliant with PBAP is determined. When the cellular phone is determined to be compliant with PBAP, the phone book data transmitted automatically from the cellular phone 8 is stored and arranged in the work memory device 6. On the other hand, when the cellular phone is determined to be incompliant with PBAP, the phone book data stored presently in the storage memory device 7 is stored and arranged in the work memory device 6.

Thereby, if the certain cellular phone with which the communication link is established is a cellular phone 8 compliant with PBAP, the newest phone book data transmitted automatically from the cellular phone 8 can be used for retrieving a phone number and the retrieved number can be used for a phone call. On the other hand, the cellular phone with which the communication link is established may be a cellular phone 9 incompliant with PBAP. In this case, if the phone book data stored in the storage memory device 7 are not newest but desirable, the phone book data can be used for retrieving a phone number and the retrieved phone number can be used for making a phone call. Therefore, even if the navigation apparatus 1 establishes a communication link with either a cellular phone 8 compliant with PBAP or a cellular phone 9 incompliant with PBAP, the usability of the phone book data can be enhanced.

Moreover, when the cellular phone with which the communication link is established is a cellular phone 9 incompliant with PBAP, the phone book data stored presently in the storage memory device 7 is stored and arranged in the work memory device 6. Then, the user is whether to transmit the phone book data. When the user selects transmitting the phone book data, transmission of the phone book data is demanded to the cellular phone 9. The phone book data transmitted from the cellular phone 9 is stored and arranged in the storage memory device 7 and work memory device 6. Thus, the newest phone book data stored presently in the cellular phone 9 incompliant with PBAP can be stored and arranged in the storage memory device 7. When the communication link is next established with the cellular phone 9, the newest phone book data presently stored in the cellular phone incompliant with PBAP will be able to be used.

The present invention is not limited only to the above-mentioned embodiment, and can be modified or extended as follows. The in-vehicle handsfree apparatus can be a handsfree dedicated apparatus which mainly includes the handsfree function. The Bluetooth communication between the cellular phone and in-vehicle handsfree apparatus can be another wireless communication or a wired communication.

Each or any combination of processes, steps, or means explained in the above can be achieved as a software unit (e.g., subroutine) and/or a hardware unit (e.g., circuit or integrated circuit), including or not including a function of a related device; furthermore, the hardware unit can be constructed inside of a microcomputer.

Furthermore, the software unit or any combinations of multiple software units can be included in a software program, which can be contained in a computer-readable storage media or can be downloaded and installed in a computer via a communications network.

It will be obvious to those skilled in the art that various changes may be made in the above-described embodiments of the present invention. However, the scope of the present invention should be determined by the following claims.

What is claimed is:

1. An in-vehicle handsfree apparatus comprising:
a communication unit configured to establish a communication link with either a cellular phone compliant with a communication protocol or a cellular phone noncompliant with the communication protocol, the communication protocol specifying automatic transmission of phone book data;
a first storing unit configured to store phone book data transmitted from a cellular phone;
a second storing unit configured to store phone book data transmitted from a cellular phone; and
a control unit configured to retrieve phone book data which are stored in the first storing unit in cases that a request for using phone book data occurs, wherein:
the control unit executes a determination as to whether a certain cellular phone, with which the communication unit establishes the communication link, is compliant with the communication protocol;
in cases that the control unit makes a first determination that the certain cellular phone is compliant, the control unit stores and arranges, in the first storing unit, phone book data, which are transmitted automatically from the certain cellular phone based on the communication protocol specifying automatic transmission of the phone book data; and
in cases that the control unit makes a second determination that the certain cellular phone is not compliant and determines that the second storing unit stores phone book data at a time when the second determination is made, the control unit stores and arranges, in the first storing unit, the phone book data, which are stored in the second storing unit at the time when the second determination is made.

2. The in-vehicle handsfree apparatus of claim 1, wherein:
in cases that the control unit makes the second determination that the certain cellular phone is not compliant and determines that the second storing unit stores phone book data at the time when the second determination is made, the control unit stores and arranges in the first storing unit the phone book data, which are stored in the second storing unit, and asks a user whether to transmit phone book data; and in cases that the user selects transmitting phone book data, the control unit demands transmission of phone book data from the certain cellular phone, and stores and arranges the phone book data which are transmitted from the certain cellular phone in the first storing unit and the second storing unit.

3. The in-vehicle handsfree apparatus of claim 1, wherein:
in cases that the control unit makes the second determination that the certain cellular phone is not compliant and determines that the second storing unit does not store the phone book data at the time the second determination is made,
the control unit asks a user whether to transmit phone book data; and
in cases that the user selects transmitting phone book data, the control unit
demands transmission of phone book data from the certain cellular phone, and
stores and arranges phone book data, which are transmitted from the certain cellular phone, in the first storing unit and the second storing unit.

4. The in-vehicle handsfree apparatus of claim 1, wherein:
the control unit asks a user whether to transmit phone book data from the certain cellular phone, in cases that the control unit makes the second determination that the certain cellular phone is not compliant.

5. The in-vehicle handsfree apparatus of claim 1, wherein:
the control unit asks a user whether to transmit phone book data from the certain cellular phone, in cases that the control unit makes the second determination that the certain cellular phone is not compliant and determines that the second storing unit does not store the phone book data at the time the second determination is made.

6. An in-vehicle handsfree apparatus comprising:
a communication unit configured to establish a communication link with either a first cellular phone compliant with a communication protocol or a second cellular phone noncompliant with the communication protocol, the communication protocol specifying automatic transmission of phone book data;
a first storing unit configured to store phone book data transmitted from the first cellular phone or the second cellular phone;
a second storing unit configured to store phone book data transmitted from the first cellular phone or the second cellular phone; and
a control unit configured to use the phone book data stored in the first storing unit when a request for using phone book data occurs,
the control unit determining whether a certain cellular phone, with which the communication unit establishes the communication link, is compliant with the communication protocol; wherein
(i) when determining that the certain cellular phone is compliant, the control unit stores and arranges, in the first storing unit, phone book data, which are transmitted automatically from the certain cellular phone based on the communication protocol;
(ii) when determining that the certain cellular phone is not compliant and determining that the second storing unit presently stores phone book data,
the control unit stores and arranges, in the first storing unit, the phone book data, which are presently stored in the second storing unit and asks a user whether to transmit phone book data; and
(iii) when the user selects transmitting phone book data, the control unit demands transmission of the phone book data from the certain cellular phone, and stores and arranges the phone book data transmitted from the certain cellular phone in the first storing unit and the second storing unit.

7. The in-vehicle handsfree apparatus according to claim 6, wherein:
the control unit asks a user whether to transmit phone book data from the certain cellular phone, when determining that the certain cellular phone is not compliant and determining that the second storing unit presently does not store phone book data.

8. An in-vehicle handsfree apparatus comprising:
a communication unit configured to establish a communication link with a cellular phone compliant or noncompliant with a communication protocol, which specifies automatic transmission of phone book data;
a determination unit configured to execute a determination as to whether a cellular phone, with which the communication link is established, is compliant with the communication protocol specifying automatic transmission of phone book data, the determination being executed without any intervention of a user after the communication link is established; and
a control unit configured to,
in cases that the determination unit makes a first determination that the cellular phone is compliant, display and make available phone book data, which are transmitted automatically from the cellular phone, and
in cases that the determination unit makes a second determination that the cellular phone is not compliant, display and make available phone book data, which are previously stored in the in-vehicle handsfree apparatus, at a time when the second determination that the cellular phone is not compliant is made.

9. The in-vehicle handsfree apparatus according to claim 8, the control unit being further configured to ask a user whether to transmit phone book data from the cellular phone, in cases that the determination unit makes the second determination that the cellular phone is not compliant.

10. The in-vehicle handsfree apparatus according to claim 8,
the control unit being further configured to ask a user whether to transmit phone book data from the cellular phone, in cases that the determination unit makes the second determination that the cellular phone is not compliant, and determines that phone book data are not previously stored in the in-vehicle handsfree apparatus at a time when the second determination that the cellular phone is not compliant is made.

11. A method for using phone book data of a cellular phone in a handsfree apparatus, the method comprising:
establishing a communication link with a cellular phone compliant or noncompliant with a communication protocol, which specifies automatic transmission of phone book data;
executing a determination as to whether the cellular phone, with which the communication link is established, is compliant with the communication protocol specifying automatic transmission of phone book data, the determination being executed without any intervention of a user after the communication link is established;

displaying and making available phone book data, which are transmitted automatically from the cellular phone, in cases that a first determination that the cellular phone is compliant is made; and displaying and making available phone book data, which are previously stored in the handsfree apparatus at a time when a second determination that the cellular phone is not compliant is made.

12. The method according to claim 11, further comprising:
asking a user whether to transmit phone book data from the cellular phone when the second determination that the cellular phone is not compliant is made.

13. The method according to claim 11, further comprising:
asking a user whether to transmit phone book data from the cellular phone, in cases that the second determination that the cellular phone is not compliant is made and it is determined that phone book data are not previously stored in the in-vehicle handsfree apparatus at the time when the second determination that the cellular phone is not compliant is made.

14. An in-vehicle handsfree apparatus comprising:
a communication unit configured to establish a communication link with either a cellular phone compliant with a communication protocol or a cellular phone noncompliant with the communication protocol, the communication protocol specifying automatic transmission of phone book data;
a control unit configured to enable making a phone call using phone book data in cases that a request for using phone book data occurs,
wherein:
(i) in cases that a first determination is made, without any intervention of a user after the communication link is established, such that a cellular phone with which the communication link is established is compliant with the communication protocol specifying automatic transmission of phone book data,
the control unit enables making a phone call using phone book data which are automatically transmitted from the cellular phone based on the communication protocol specifying automatic transmission of phone book data, according to the request for using phone book data; and
(ii) in cases that a second determination is made, without any intervention of the user after the communication link is established, such that a cellular phone with which the communication link is established is not compliant with the communication protocol specifying automatic transmission of phone book data,
the control unit enables making a phone call using phone data which are stored in a storing unit in the in-vehicle handsfree apparatus at a time when the second determination is made such that the cellular phone with which the communication link is established is not compliant with the communication protocol specifying automatic transmission of phone book data, according to the request for using phone book data.

15. The in-vehicle handsfree apparatus according to claim 14, wherein:
in cases that the second determination is made, without any intervention of the user after the communication link is established, such that the cellular phone with which the communication link is established is not compliant with the communication protocol specifying automatic transmission of phone book data,
the control unit asks a user whether to transmit phone book data from the cellular phone.

16. The in-vehicle handsfree apparatus according to claim 14, wherein:
in cases that the second determination is made, without any intervention of the user after the communication link is established, such that the cellular phone with which the communication link is established is not compliant with the communication protocol and it is determined that phone data are not stored in the storing unit in the in-vehicle handsfree apparatus at the time when the second determination is made such that the cellular phone with which the communication link is established is not compliant with the communication protocol,
the control unit asks a user whether to transmit phone book data from the cellular phone with which the communication link is established.

17. A method for using phone book data of a cellular phone in a handsfree apparatus, the method comprising:
establishing a communication link with a cellular phone;
executing, when the communication link is established with the cellular phone, a determination as to whether the cellular phone is compliant with a communication protocol, which specifies automatic transmission of phone book data, the determination being executed without any intervention of a user after the communication link is established;
enabling making a phone call using phone book data, which are automatically transmitted from the cellular phone at a time when a first determination is made such that the cellular phone with which the communication link is established is compliant with the communication protocol specifying automatic transmission of phone book data according to a request for using phone book data; and
enabling making a phone call using phone data, which are stored in a storing unit in the handsfree apparatus at a time when a second determination is made such that the cellular phone with which the communication link is established is not compliant with the communication protocol specifying automatic transmission of phone book data, according to a request for using phone book data.

18. The method according to claim 17, further comprising:
asking a user whether to transmit phone book data from the cellular phone with which the communication link is established, in cases that the second determination is made such that the cellular phone with which the communication link is established is not compliant with the communication protocol specifying automatic transmission of phone book data.

19. The method according to claim 17, further comprising:
asking a user whether to transmit phone book data from the cellular phone with which the communication link is established, in cases that the second determination is made such that the cellular phone with which the communication link is established is not compliant with the communication protocol specifying automatic transmission of phone book data and it is determined that phone book data are not stored in the in-vehicle handsfree apparatus at the time when the second determination that the cellular phone is not compliant is made.

* * * * *